(12) United States Patent
Griniasty

(10) Patent No.: US 6,728,674 B1
(45) Date of Patent: Apr. 27, 2004

(54) METHOD AND SYSTEM FOR TRAINING OF A CLASSIFIER

(75) Inventor: Meir Griniasty, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 09/629,704

(22) Filed: Jul. 31, 2000

(51) Int. Cl.[7] .............................................. G10L 15/06
(52) U.S. Cl. ...................................... 704/256; 704/250
(58) Field of Search ............................... 704/231, 232, 704/243, 244, 256, 250

(56) References Cited

U.S. PATENT DOCUMENTS

| | | | |
|---|---|---|---|
| 4,827,521 A | | 5/1989 | Bahl et al. |
| 5,638,486 A | | 6/1997 | Wang et al. |
| 5,638,487 A | * | 6/1997 | Chigler ........................ 704/246 |
| 5,805,731 A | * | 9/1998 | Yaeger et al. ................ 382/228 |
| 5,806,029 A | | 9/1998 | Buhrke et al. |
| 5,839,103 A | | 11/1998 | Mammone et al. |
| 5,937,384 A | | 8/1999 | Huang et al. |
| 6,044,344 A | * | 3/2000 | Kanevsky ..................... 704/256 |
| 6,131,089 A | | 10/2000 | Campbell et al. |
| 6,539,352 B1 | * | 3/2003 | Sharama et al. ............. 704/249 |

OTHER PUBLICATIONS

B.H. Juang, et al., "Discriminative Learing for Minimum Error Classification", IEEE Transactions on Signal Processing, Dec. 1992, vol. 40, No. 12, pp. 3043–3054.
W. Reichl et al., "Discriminative Training for Continuous Speech Recognition", EUROSPEECH '95, 4th European Conference on Speech Communication and Technology, Madrid, Sep. 1995, pp. 537–540, ISSN 1018–4074.
L. Rabiner et al., "Fundamentals of Speech Recognition", pp. 376–377.

* cited by examiner

*Primary Examiner*—Daniel Abebe
(74) *Attorney, Agent, or Firm*—Eitan, Pearl, Latzer & Cohen Zedek, LLP

(57) ABSTRACT

A method and a system for corrective training of speech models includes changing a weight of a date sample whenever a data sample is incorrectly associated with a classifier and retraining each classifier with the weights.

29 Claims, 4 Drawing Sheets

FIG.6

| FRAME NUMBER | 1 | 2 | 3 | 4 | 5 | 6 | 7 | 8 | 9 | 10 | 11 | 12 | |
|---|---|---|---|---|---|---|---|---|---|---|---|---|---|
| SUPERVISED WORD | n | 3 | 3 | 3 | 4 | 4 | 4 | 4 | n | n | n | n | |
| SUPERVISED STATE | 0 | 0 | 1 | 2 | 0 | 0 | 1 | 2 | 0 | 0 | 0 | 0 | |
| UNSUPERVISED WORD | n | 5 | 5 | 5 | 5 | 4 | 4 | 4 | n | n | n | n | |
| UNSUPERVISED STATE | 0 | 0 | 1 | 2 | 2 | 0 | 1 | 2 | 0 | 0 | 0 | 0 | |

- Frame 1: CORRECT
- Frames 2–4: EMPHASIZE FOR DIGIT 3
- Frame 5: EMPHASIZE FOR DIGIT 4
- Frames 6–12: CORRECT

METHOD AND SYSTEM FOR TRAINING OF A CLASSIFIER

BACKGROUND OF THE INVENTION

Speech recognition is a classification task. In maximum likelihood classifiers, each classifier is trained by examples that belong to its class. For example, the classifier which recognizes the digit "1" is trained by multiple pronunciations of the digit "1".

A commonly used classifier is a Hidden Markov Model (HMM). Each word is modeled by a different HMM which serves as an abstract "picture" of this word, with all its possible variations. The HMM consists of a sequence of "states", each state is responsible for the description of a different part of the word. The use of HMM in speech recognition consists of two phases: the training phase and the recognition phase. In the training phase, repetitions of each word from the training data are used to construct the corresponding HMM. In the recognition phase, the word models may be used to identify unknown speech by checking the unknown speech against the existing models.

Some words sound similar to each other and can therefore be incorrectly recognized. Using digits as examples, "go" (5) and "rok" (6) in Japanese and "seven" and "eleven" in English sound sufficiently similar to cause an incorrect recognition.

BRIEF DESCRIPTION OF THE DRAWINGS

The present invention will be understood and appreciated more fully from the following detailed description taken in conjunction with the appended drawings in which:

FIG. 6 is an exemplary state sequence for incorrectly segmented connected words "3,4" wherein the correctly and incorrectly associated frames are noted.

DETAILED DESCRIPTION OF THE PRESENT INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description which follow are presented in terms, of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a setf-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

The present invention will be described herein for full word models, it is fully applicable for models of at least one portion of a word, such as monophones or triphones, and these are included in the scope of the present invention.

In general, the present invention describes a method of corrective training for classifiers that are trained initially by a maximum likelihood-based training system. The general procedure may be as follows:

The first step may be initialization of classes. For each class, train a model based only on same-class data.

The second step may be classification which classifies the data of all of the classes using all of the classifiers. Each data sample is associated with one classifier.

The third step may be emphasis of errors. Whenever a data sample is incorrectly associated with a classifier, a weight associated with that data sample is increased.

The fourth step may be training with new weights. Each classifier is re-trained, but with the relative weights that were set in the previous step. Finally, the four steps are repeated as necessary, e.g., until a termination criterion is met.

Figure 1:
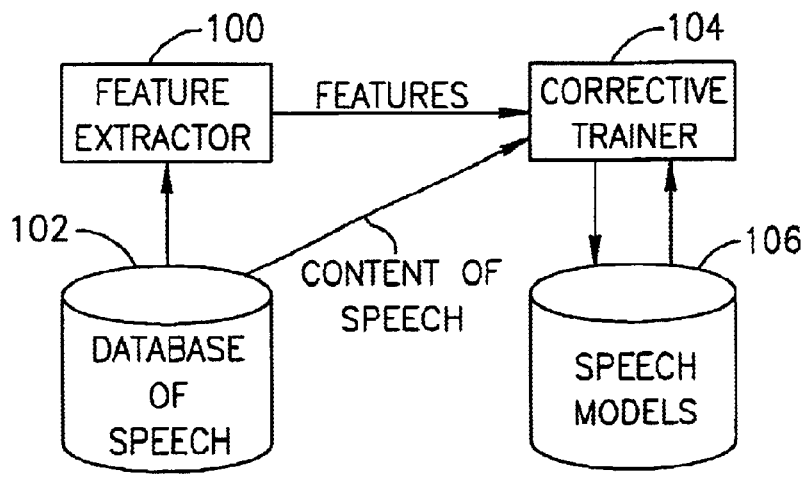
FIG. 1 is a block diagram illustration of a corrective training system, which may be constructed and operative in accordance with an embodiment of the present invention.
Figure 2A:
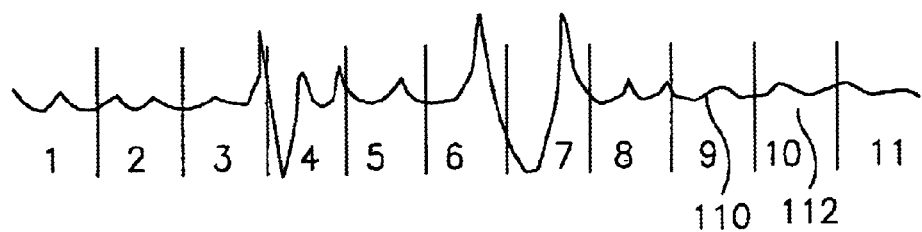
FIG. 2A is a schematic illustration of speech signal for the phrase: noise "seven" noise.
Figure 2B:
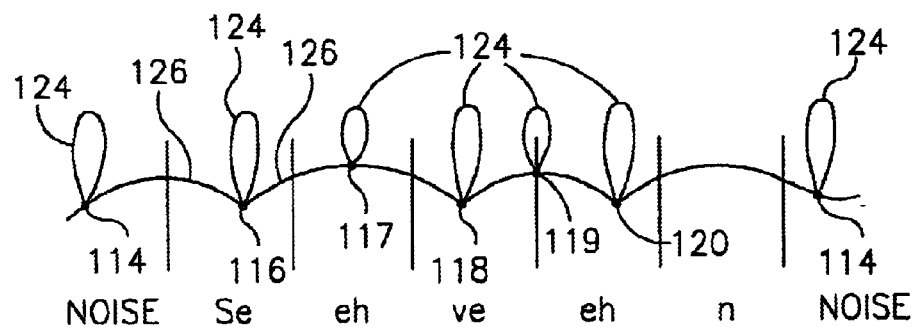
FIG. 2B is a schematic illustration of a Hidden Markov Model (HMM) which may be match the signal of FIG. 2A.

Reference is now made to FIG. 1, which illustrates a system of corrective training of speech models. An embodiment of the present invention may be a Hidden Markov Model (HMM) classifier. Reference is further made to FIGS. 2A and 2B, which show an exemplary speech signal and its model and are useful in understanding the embodiment of FIG. 1.

The system may comprise a feature extractor 100 (FIG. 1), a speech database 102 of speech signals, a corrective trainer 104 and a model database 106 of speech models.

Speech database 102 may store multiple versions of speech phrases to be trained and a notation of the word content of the phrase. FIG. 2A shows an exemplary speech signal 110, as stored in database 102, where the phrase "seven" is spoken, surrounded by noise before and after. FIG. 2B shows the resultant word models as stored in model database 106. Noise may be represented as a separate word and hence, has its own word model.

Speech signal 110 may be sampled at 8000 Hz and then may be divided into a multiplicity of frames 112, of 30 milliseconds each. Thus, each frame includes 240 samples. Feature extractor 100 processes speech signal 110 and a smaller number of features may be obtained, e.g. around twenty. In some embodiments of the invention, cepstral features and their time derivatives are used These features are the basis for speech recognition and, in some embodiments of the present invention, are provided to corrective trainer 104.

In the example of FIG. 2A, there are 11 frames. Frames 1, 2, 9, 10 and 11 are frames of noise, frame 3 includes the sound "se", frames 4 and 5 include the sound "eh" (after an s), frame 6 includes the sound "ve", frame 7 includes the sound "eh" (after a v), and frame 8 includes the sound "n".

Model database 106 stores HMM models for each of the possible words, phrases or sounds that the system can recognize. In each HMM model, each of the sounds may be considered a different state. The phrase of FIG. 2A is modeled as an ordered sequence of states. Thus, the states progress from a noise state 114, to a "se" state 116, to an "eh" state 117, to a "ve" state 118, to an "eh" state 119, to a "n" state 120, and finally to second noise state 114.

States may be spread over several frames. Thus, frames 1 and 2 may correspond to noise state 114, frames 4 and 5 may correspond to "eh" state 117, and frames 9, 10 and 11 may correspond to noise state 114.

From each state, two types of motion may be possible, to remain at the state as indicated by loops 124, or to transition from one state to the next as indicated by arcs 126. When a left-to-right HMM remains in the same state, as indicated by loops 124, then the state may comprise more than one frame. When the left-to-right HMM transitions to the next state, as indicated by arcs 126, then the next frame may correspond to a different state.

Corrective trainer 104 may receive the features of a stored speech signal from feature extractor 100 and the associated content of the speech signal from speech database 102. Corrective trainer 104 then may perform a modified version of the "segmental k-means algorithm" (known in the art) to train the models. Corrective trainer 104 may compare the speech signal to the word models stored in model database 106 and may find the best match. As described in more detail hereinbelow, corrective trainer 104 may note errors in the matching and may use this information to correct the associated speech model.

In an embodiment of the present invention, the training data may be segmented twice, once in a supervised fashion and once in an unsupervised manner. These two segmentations should have the same results. If not, then the supervised segmentation may be regarded as the correct one. Any incorrectly recognized segment (frame) of speech may be emphasized and may receive extra weight. During a re-estimation procedure, each frame associated with the word being re-estimated may be weighted differently, depending on whether it has been correctly recognized or not.

In a segmental k-means algorithm training session, each word has its own model. The session starts with an initial HMM model, that may be crafted "manually", and with several repetitions of the word being trained. The training process consists of two parts: supervised segmentation (or "forced alignment") and re-estimation of model parameters. In supervised segmentation, the contents of the data is known, e.g. the word "seven" is known but which frames belong to which states is not known. Once frames have been associated with states, the state parameters are re-estimated based on the frames that were associated with it.

Figure 3:
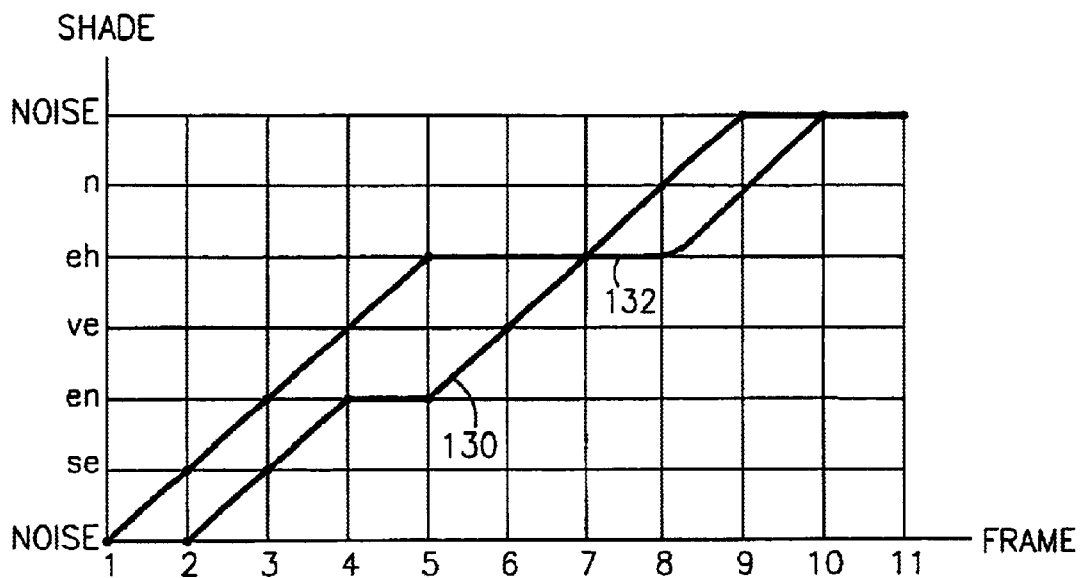
FIG. 3 is a schematic illustration of the Viterbi algorithm.

Reference is now made to FIG. 3, which generally illustrates the process of supervised segmentation. FIG. 3 shows a grid of known states vs. frames and two paths 130 and 132 through the grid. Path 130 is the path discussed hereinabove (state 1 and 2 are noise, etc.). Path 132 is an alternative path that also matches the data. Supervised segmentation produces a plurality of paths through the grid and selects the one path that provides the best match to the data. This process is also known as the Viterbi algorithm.

At each step, a path variable $\psi_{t,j}$ and a score variable $\delta_{t,j}$ are temporarily stored. Score variable $\delta_{t,j}$ stores the score of the best path (e.g. the path with the highest score) that terminates at gridpoint (t,j), where t is the frame index and j is the state index. Score variable $\delta_{t,j}$ may be determined as follows:

$$\delta_{t,j} = \max_i [\delta_{t-1,i} + \log a_{i,j}] + \log b_j(\overline{x}_1), \qquad \text{Equation 1}$$

where i may have the value of either j or j−1, $a_{i,j}$ is the transition probability from state i to state j given in equation 10 and $b_j(\overline{x}_t)$ is the measure of the match of frame t with state j and is defined hereinbelow in equation 4.

Path variable $\psi_{t,j}$ points to the previous step in the path, for example, path 130 includes the point (3,se). Path variable $\psi_{t,j}$ at that point stores the value (2,noise), the previous point on path 130. Path variable $\psi_{t,j}$ is determined by:

$$\psi_{t,j} = \arg\max_i [\delta_{t-1,i} + \log a_{i,j}], \qquad \text{Equation 2}$$

where i can be either j or j−1.

When all paths are complete, the path with the highest score is the deemed the best path, e.g. the optimal segmentation.

After selecting the best path, the path is "backtracked" in order to associate a frame to a state. At each gridpoint, the value stored in path variable $\psi_{t,j}$ is unpacked in order to determine the previous point of the path. Furthermore, the value stored in path variable $\psi_{t,j}$ determines the state $q_t$ to which frame t belongs. Mathematically, this is written:

$$q_t = \psi_{t+1, q_{t+1}} \qquad \text{Equation 3}$$

Once the path has been backtracked, the frames can be associated with their corresponding states.

The model of a state is a mixture of gaussian probability functions which give the probability that a feature or vector of features $\overline{x}$ of a frame of the speech data exists in a state.

$$b_{iq}(\overline{x}) = \sum_s W_{iqg} P_{iqg}(\overline{x}), \qquad \text{Equation 4}$$

Figure 4:
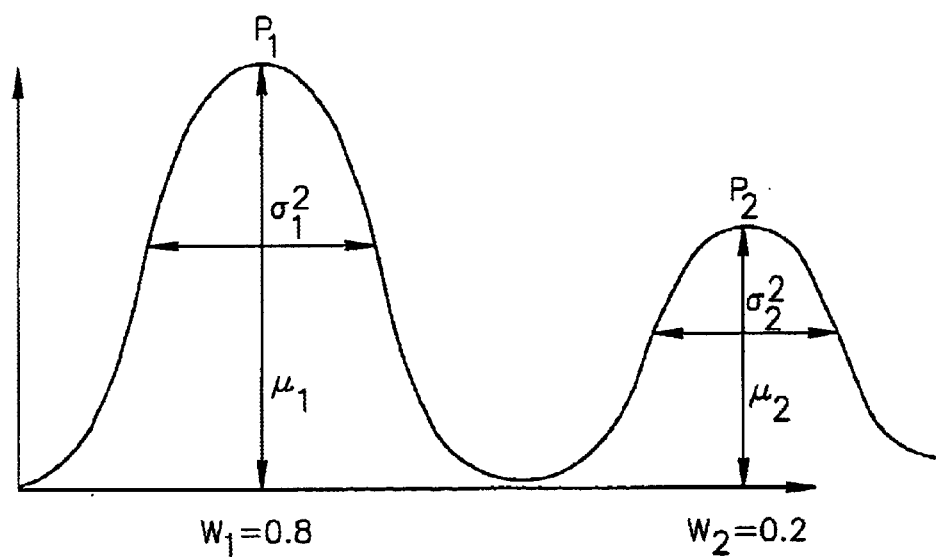
FIG. 4 is a schematic illustration of a pair of gaussian functions.

For example, FIG. 4 to which reference is now made, is a representation of a mixture of two gaussian functions $P_1$ and $P_2$ of state q and word i. Each gaussian distribution $P_{iqg}(\overline{x})$ function has an average $\mu$ and a variance $\sigma^3$.

The weights $W_{iqg}$ for each gaussian function g determine the contribution of the gaussian to the overall distribution. For instance in FIG. 4, gaussian $P_2$ has a lower height and smaller weight $W_2$ than gaussian $P_1$.

The averages $\mu$ are estimated by:

$$\mu_{iqgd} = \frac{\sum_f P_{iqg}(\overline{x}_f) x_{fd}}{\sum_f P_{iqg}(\overline{x}_f)}, \qquad \text{Equation 5}$$

where the summation $\Sigma$, is over all the frames f that belong to state q of word i, and d is one of the elements of vector x.

The variances may be estimated by $$\sigma^2_{iqgd} = \overline{x^2_{iqgd}} - \mu^2_{iqgd} \quad \text{where} \qquad \text{Equation 6}$$

$$\overline{x^2_{iqgd}} = \frac{\sum_f P_{iqg}(\overline{x}_f) x^2_{fd}}{\sum_f P_{iqg}(\overline{x}_f)} \quad \text{and} \qquad \text{Equation 7}$$

$$\rho_{iqg}(\overline{x}) = \frac{W_{iqg} P_{iqg}(\overline{x})}{\sum_h W_{iqh} P_{iqh}(\overline{x})}. \qquad \text{Equation 8}$$

The weights of the gaussians may be given by $$W_{iqg} = \frac{\sum_f \rho_{iqg}(\overline{x}_f)}{\sum_{g,f} \rho_{iqg}(\overline{x}_f)} \qquad \text{Equation 9}$$

and the transition probabilities may be given by $$a_{q,q+1} = \frac{1}{\text{average duration in state } q}. \qquad \text{Equation 10}$$

Figure 5:
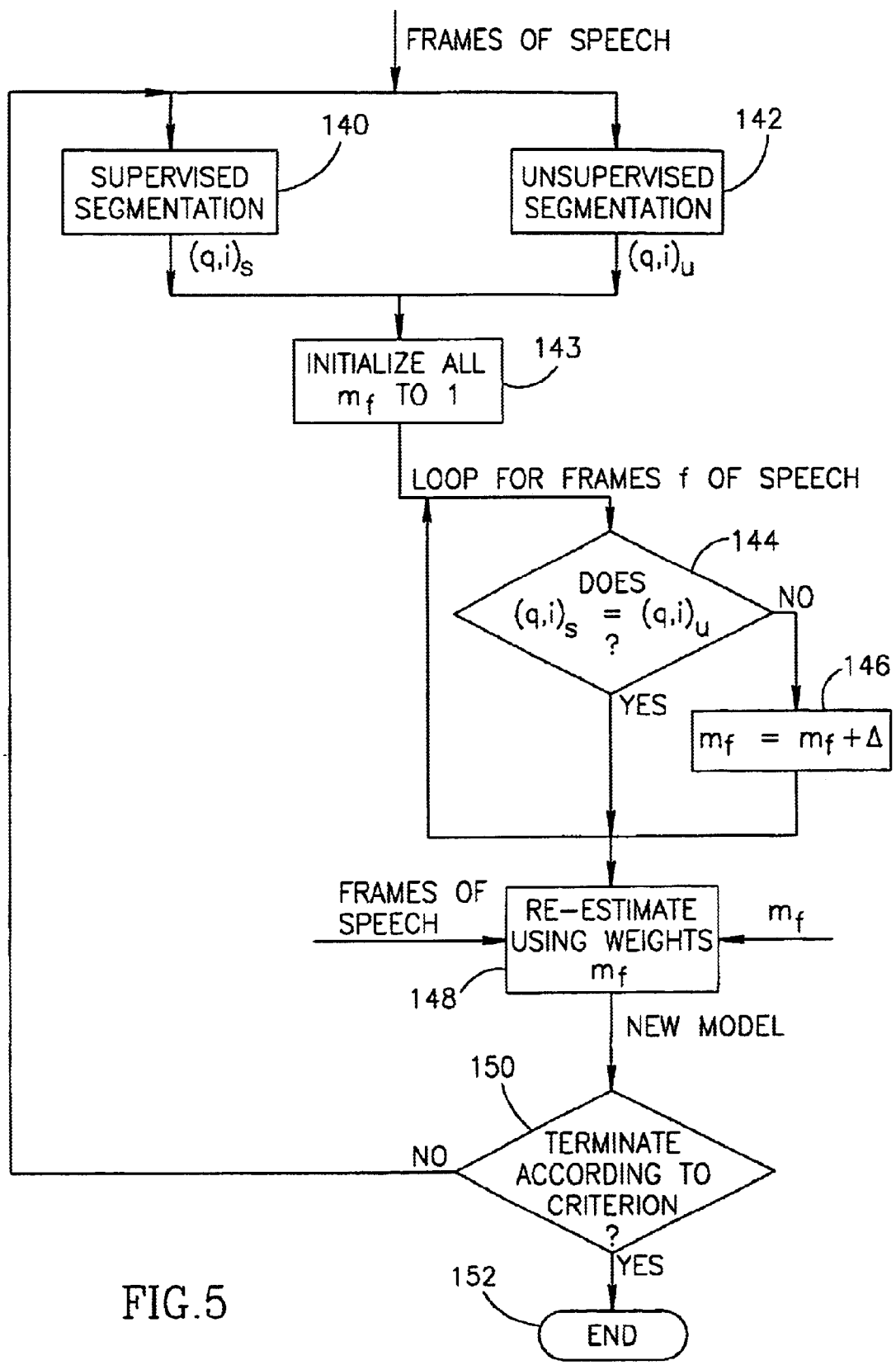
FIG. 5 is a flow chart illustration of the corrective training that may be used in accordance with the present invention.

Reference is now made to FIG. 5, which illustrates one embodiment of a method performed by corrective trainer 104.

In the method of FIG. 5, the incorrectly recognized states may be emphasized during re-estimation. For each phrase recorded in the database, two segmentations may be performed. In step 140, supervised segmentation, described hereinabove, provides the correct association $(q,i,f)_A$ of state q of word i with frame f. An unsupervised segmentation (step 142) produces a second state association $(q,i,f)_M$.

Unsupervised segmentation is an operation similar to the segmentation of recognition in which the speech signal may be compared to all of the models in model database 106 (FIG. 1). This operation is known in the art and, therefore, will not be further described herein.

An embodiment of the present invention compares (step 144) the state associations from the unsupervised and supervised segmentations. For a frame whose association in the unsupervised segmentation is incorrect, a weight $m_f$ is increased (step 146) by some amount Δ, where Δ may be 1. It is noted that a weight $m_f$ may be initialized to 1 at the beginning of the process (step 143).

In accordance with an embodiment of the present invention, re-estimation (step 148) is now performed to recalculate the model of each word. However, in the re-estimation of an embodiment of the present invention, each frame f is weighted by its associated weight $m_f$.

Specifically, the re-estimation equations are:

$$\mu_{iqgd} = \frac{\sum_f \rho_{iqg}(\overline{x}_f) m_f x_{fd}}{\sum_f \rho_{iqg}(\overline{x}_f) m_f} \text{ and} \qquad \text{Equation 11}$$

where the summation Σ, is over all the frames f that belong to state q of word i, and d is one of the elements of vector x.

The variances may be estimated by $$\sigma^2_{iqgd} = \overline{x^2_{iqgd}} - \mu^2_{iqgd} \qquad \text{Equation 12}$$

where $$\overline{x^2_{iqgd}} = \frac{\sum_f \rho_{iqg}(\overline{x}_f) m_f x^2_{fd}}{\sum_f \rho_{iqg}(\overline{x}_f) m_f}, \qquad \text{Equation 13}$$

$\overline{x^2}$ is the average of x squared, and $$\rho_{iqg}(\overline{x}) = \frac{W_{iqg} P_{iqg}(\overline{x})}{\sum_h W_{iqh} P_{iqh}(\overline{x})}. \qquad \text{Equation 14}$$

The new weights of the gaussians are given by:

$$W_{iqg} = \frac{\sum_f \rho_{iqg}(\overline{x}_f) m_f}{\sum_{g,f} \rho_{iqg}(\overline{x}_f) m_f} \qquad \text{Equation 15}$$

and the new transition probabilities are given by:

$$a_{q,q+1} = \frac{1}{\text{average duration in state } q}. \qquad \text{Equation 16}$$

An embodiment of the present invention may comprise a termination criterion, calculated in step 150. An example of the criterion may be to calculate the sum of the weights $m_f$ for all frames and normalize by the number of frames, or:

$$\text{criterion} = \Sigma_f m_f / \Sigma_f 1 \qquad \text{Equation 17}$$

The value of the criterion is 1 before corrective training (since no frames have yet been emphasized). If the termination criterion exceeds a predetermined threshold (such as 2) or if there are no more classification errors, the process terminates (step 152).

Reference is now made to FIG. 6, which presents the output of the supervised and unsupervised segmentation operations for a speech signal in which the combination "3,4" was said. In the unsupervised segmentation, the digit "3" was mis-recognized as "5". The word noise is represented by the letter "n".

The first row indicates the frame number, the second and third row indicate the word and state association produced by the supervised segmentation (step 140) and the fourth and fifth row indicate the word and state association produced by the unsupervised segmentation (step 142). As can be seen, the results match for frames 1 and 6–12. Thus, these frames may be indicated as being correct and their weights $m_f$ will remain as they were previously.

The remaining frames are incorrectly matched. Frames 2, 3 and 4 should be associated with digit 3 and are incorrectly matched to digit 5. These frames, which are part of the re-estimation of digit 3, may have their weights $m_f$ increased. Frame 5 is incorrectly matched to digit 5 when it should be matched to digit 4. This frame, which is part of the re-estimation of digit 4, also has its weight $m_f$ increased.

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

It will be appreciated by persons skilled in the art that the present invention is not limited by what has been particularly shown and described herein above. Rather the scope of the invention is defined by the claims that follow:

What is claimed is:

1. A method comprising:
    comparing between a first classification of a plurality of data samples based on unsupervised segmentation and a second classification of said plurality of data samples based on supervised segmentation using a plurality of classification parameters;

adjusting weights of said data samples by emphasizing the weight of one or more data samples which are incorrectly classified by said first classification; and re-estimating said classification parameters using said adjusted weights.

2. A method according to claim 1 further comprising re-classifying said data samples using said re-estimated classification parameters.

3. A method according to claim 2 further comprising repeating said comparing, said adjusting, said re-estimating and said re-classifying until a termination criterion is met.

4. A method according to claim 3 wherein said termination criterion is met when said second classification is substantially unchanged by said re-classifying.

5. A method according to claim 3 wherein said termination criterion is met when the sum of all of said weights normalized by the number of said data samples exceeds a predetermined value.

6. A method according to claim 1 wherein said data samples are classified in a plurality of classes, each class corresponding to at least a portion of a word.

7. A method according to claim 6 wherein said at least a portion of a word comprises at least one individual word.

8. A method according to claim 6 wherein said at least a portion of a word comprises at least two connected words.

9. A method according to claim 6 wherein said at least a portion of a word comprises a monophone.

10. A method according to claim 6 wherein said at least a portion of a word comprises a triphone.

11. A method for corrective training of Hidden Markov Models (HMMs) of at least a portion of a word, the method comprising:

providing initial weights to frames of said at least a portion of a word;

comparing between a first classification of said frames based on unsupervised segmentation and a second classification of said frames based on supervised segmentation using a plurality of classification parameters;

adjusting said weights by increasing the weight of one or more frames which are incorrectly classified by said first classification;

re-estimating said classification parameters using said adjusted weights; and re-classifying said frames using said re-estimated classification parameters.

12. A method according to claim 11 further comprising repeating said comparing, said adjusting, said re-estimating, and said re-classifying until a termination criterion is met.

13. A method according to claim 12 wherein said termination criterion is met when said second classification is substantially unchanged by said re-classifying.

14. A method according to claim 12 wherein said termination criterion is met when the sum of all of said weights normalized by the number of said frames exceeds a predetermined value.

15. A method according to claim 11 wherein said at least a portion of a word comprises at least one individual word.

16. A method according to claim 11 wherein said at least a portion of a word comprises at least two connected words.

17. A method according to claim 11 wherein said at least a portion of a word comprises a monophone.

18. A method according to claim 11 wherein said at least a portion of a word comprises a triphone.

19. A system comprising:

a trainer to train a plurality of classifiers with a plurality of data samples based on supervised segmentation;

an estimator to classify said data samples based on unsupervised segmentation; and a reviewer to determine if a data sample is incorrectly classified based on said unsupervised segmentation, and, if so, to emphasize a weight of said data sample.

20. A system according to claim 19 further comprising a terminator to terminate the operation of said trainer, estimator and reviewer when a termination criterion is met.

21. A system according to claim 20 wherein said trainer is able to retrain said classifiers using adjusted weights including at least one emphasized weight provided by said reviewer.

22. A system according to claim 21 wherein said termination criterion is met when said classifiers are substantially unchanged by said retraining.

23. A system according to claim 22 wherein said termination criterion is met when the sum of all of said weights normalized by the number of said frames data samples exceeds a predetermined value.

24. A system according to claim 20 wherein said data samples are classified in a plurality of classes, each class corresponding to at least a portion of a word.

25. A system according to claim 24 wherein said at least a portion of a word comprises at least one individual word.

26. A system according to claim 24 wherein said at least a portion of a word comprises at least two connected words.

27. A system according to claim 24 wherein said at least a portion of a word comprises a monophone.

28. A system according to claim 24 wherein said at least a portion of a word comprises a triphone.

29. A method for corrective training of Hidden Markov Models (HMMs) of at least one portion of a word, the method comprising:

providing an initial weight to frames of each said at least one portion of a word;

training each of said at least one portion of a word;

increasing the weight of any of said frames which is misclassified during said training;

re-estimating said states using said weights; and repeating said providing, training, increasing and re-estimating until the sum of all of said weights normalized by the number of said frames exceeds a predetermined value.

* * * * *